(12) United States Patent
Bieman et al.

(10) Patent No.: US 6,541,757 B2
(45) Date of Patent: Apr. 1, 2003

(54) DETECTION ASSEMBLY FOR DETECTING DISPENSED MATERIAL

(75) Inventors: Leonard H. Bieman, Waterford, MI (US); Edward W. Roney, Novi, MI (US)

(73) Assignee: Fanuc Robotics North America, Inc., Rochester Hills, MI (US)

( * ) Notice: Subject to any disclaimer, the term of this patent is extended or adjusted under 35 U.S.C. 154(b) by 69 days.

(21) Appl. No.: 09/789,653

(22) Filed: Feb. 21, 2001

(65) Prior Publication Data

US 2002/0113198 A1 Aug. 22, 2002

(51) Int. Cl.[7] .............................................. G06M 7/00
(52) U.S. Cl. ..................... 250/221; 250/208.2; 118/323
(58) Field of Search ............................. 250/221, 201.4, 250/578.1, 208.2, 222.1, 559.22; 118/323, 415, 668, 712, 718; 348/131; 356/624; 73/37.5, 37.7

(56) References Cited

U.S. PATENT DOCUMENTS

| | | | |
|---|---|---|---|
| 4,724,302 A | 2/1988 | Penney et al. | |
| 4,815,816 A | 3/1989 | Schneider | |
| 5,052,338 A | * 10/1991 | Maiorca et al. | 118/668 |
| 5,264,678 A | 11/1993 | Powell et al. | |
| 5,298,073 A | * 3/1994 | Wilson | 118/712 |
| 5,321,259 A | 6/1994 | Morgan | |
| 5,327,514 A | 7/1994 | Dujon et al. | |
| 5,515,470 A | 5/1996 | Eikelmann et al. | |
| 5,557,693 A | 9/1996 | Stevens et al. | |
| 5,666,325 A | 9/1997 | Belser et al. | |
| 6,024,273 A | 2/2000 | Ludewig et al. | |
| 6,093,251 A | 7/2000 | Carr et al. | |

* cited by examiner

*Primary Examiner*—Kevin Pyo
*Assistant Examiner*—Seng C. Sohn
(74) *Attorney, Agent, or Firm*—Howard & Howard

(57) ABSTRACT

The subject invention is an optical detection assembly (26) for detecting dispensed material (28). The detection assembly (26) includes a housing (38) having a number of optical sensors (42) mounted to the housing (38). A material applicator (30) is mounted within a central opening (44) of the housing (38) and extends through the opening (44) such that the sensors (42) substantially surround the applicator (30) to continuously detect the material (28) being dispensed through the applicator (30). The subject invention also includes the method of detecting the material (28) being dispensed upon a workpiece (32) utilizing a robotic apparatus (20) having an articulated arm (24) with the housing (38) mounted to the arm (24).

46 Claims, 4 Drawing Sheets

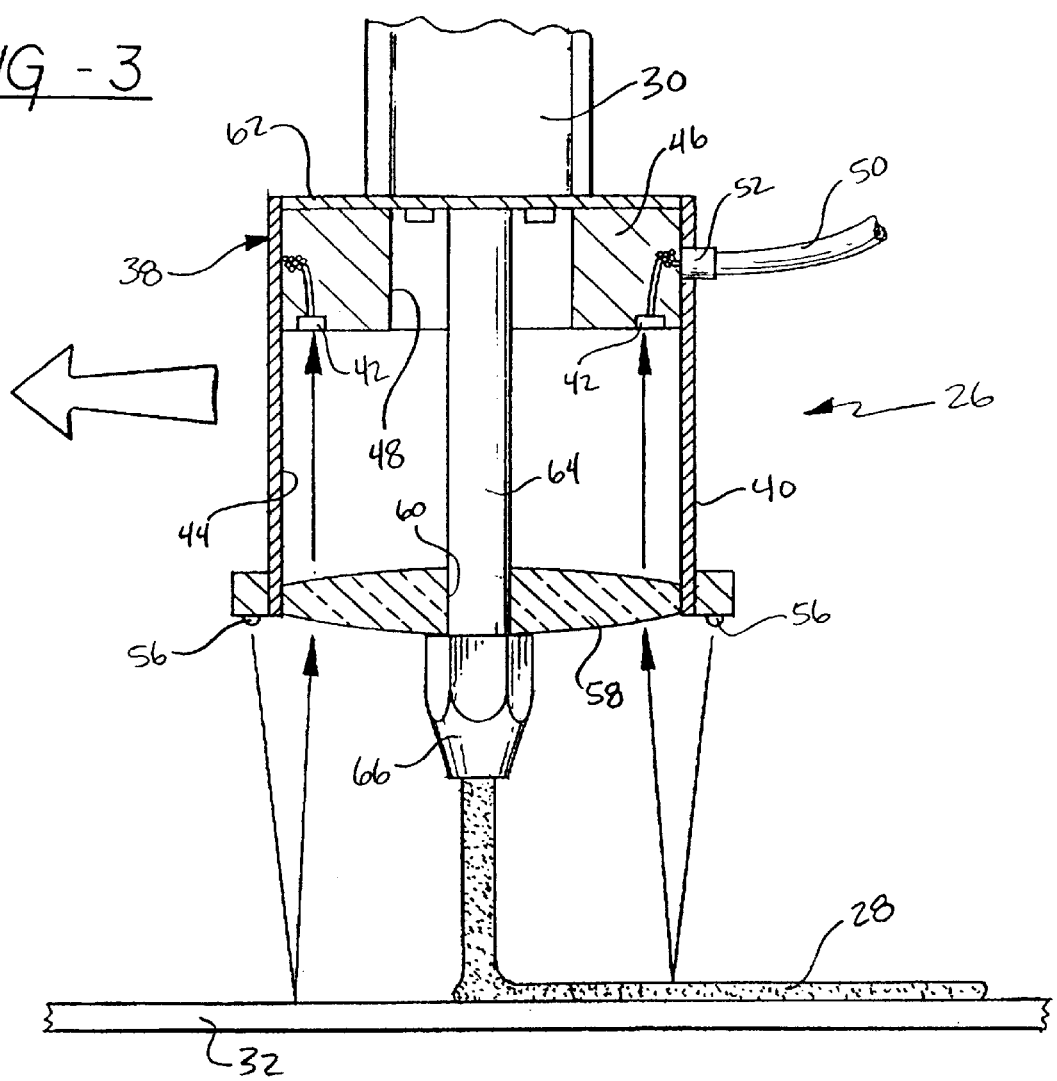
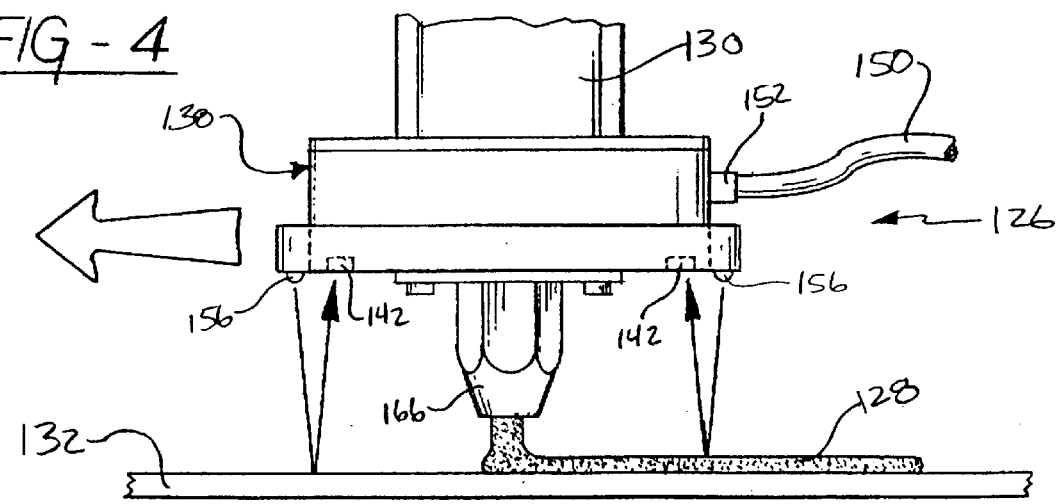

DETECTION ASSEMBLY FOR DETECTING DISPENSED MATERIAL

BACKGROUND OF THE INVENTION

1) Technical Field

The subject invention relates to an optical detection assembly for detecting dispensed material onto a workpiece.

2) Description of the Prior Art

Dispensing systems for applying a material, such as a bead of adhesive, sealant, or caulk, to a workpiece are well known in the automotive industry. The dispensing systems typically include an applicator having a nozzle for applying the material. The material may be applied in a semi-circular bead or any other suitable thickness or configuration. Typical workpieces include door and trim panels, windows, and other such parts.

The bead of adhesive or sealant being disposed, for example onto a door panel, can be used to provide a moisture barrier and/or to reduce the intrusion of debris between the door panels. In order to ensure a complete seal between the panels, the dispensing of the material should be consistently applied. The presence of air bubbles or a reduction in the material supply passing through the nozzle may create a break or gap in the dispensing of the material. Hence, there could be a disruption in the flow rate of material being dispensed so as to produce a discontinuity or deformation of the bead being deposited onto the workpiece. In other words, there may be a significantly sized gap in the continuous bead or the bead may be of insufficient height or cross-section.

Detection devices have been mounted to the dispensing systems to automatically monitor the dispensed material and recognize a gap in the bead. Examples of these detection devices are shown in U.S. Pat. Nos. 4,724,302; 5,264,678; and 5,666,325. These prior art devices include a single or a pair of sensors positioned near the applicator which may accurately detect the presence of the material as the material is being applied to a uniform or planar surface of the workpiece. The prior art devices, however, have difficulty detecting the presence or non-presence of the material along a non-uniform workpiece which may have bends, curves, contours, depressions, and the like. The sensors are not capable of detecting all of these variations.

Accordingly, it would be desirable to have a dispensing system with a detection assembly which can detect dispensed material on virtually any type of contoured workpiece.

SUMMARY OF THE INVENTION AND ADVANTAGES

The subject invention is a detection assembly for detecting dispensed material. The detection assembly comprises a housing having an outer periphery. A plurality of sensors are mounted to the housing adjacent the outer periphery. An applicator is mounted to the housing for dispensing the material. The detection assembly is characterized by the outer periphery of the housing defining a central opening with the applicator extending through the opening such that the sensors substantially surround the applicator to continuously detect the material being dispensed through the applicator.

The subject invention also includes the method of detecting the material being dispensed upon a workpiece utilizing a robot having an articulated arm with the housing mounted to the arm and the applicator mounted to the housing. The plurality of sensors substantially surround the applicator and are connected to a detector. The method comprising the steps of; dispensing the material through the applicator onto the workpiece; moving the arm along a predetermined path or moving the workpiece past the dispenser; detecting light intensity values reflected from the workpiece and the dispensed material through each of the sensors surrounding the applicator while the arm and/or workpiece moves along the predetermined path; arranging the light intensity values in a predetermined order; and receiving the arranged light intensity values within the detector to continuously detect the presence of the material applied to the workpiece.

The subject invention therefore overcomes the prior art deficiencies outlined above by providing a plurality of sensors substantially surrounding the applicator such that the detection assembly can detect dispensed material on virtually any type of contoured workpiece.

BRIEF DESCRIPTION OF THE DRAWINGS

Other advantages of the present invention will be readily appreciated as the same becomes better understood by reference to the following detailed description when considered in connection with the accompanying drawings wherein:

FIG. 3 is a cross-sectional side view of the detection assembly;

FIG. 4 is a side view of an alternative embodiment of the detection assembly;

DETAILED DESCRIPTION OF THE PREFERRED EMBODIMENT

Figure 1:
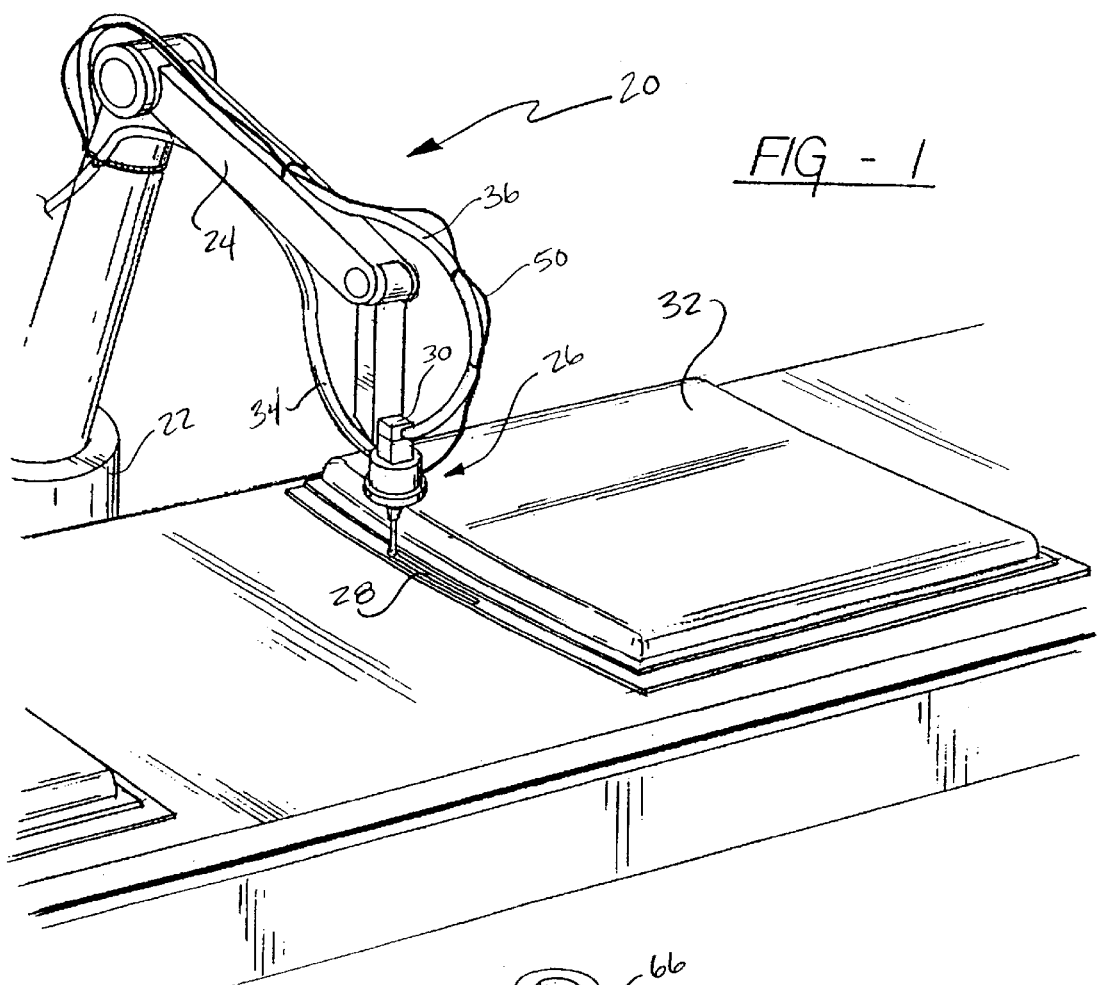
FIG. 1 is a perspective view of a robotic apparatus manipulating a detection assembly is accordance with the subject invention.

Referring to the Figures, wherein like numerals indicate like or corresponding parts throughout the several views, a robotic apparatus is generally shown at 20 in FIG. 1. The robotic apparatus 20 comprises a robot base 22 and at least one articulated arm 24 movably mounted to the robot base 22. The robotic apparatus 20 is generically illustrated and may be of any suitable design or configuration as is known in the robotic art.

The robotic apparatus 20 incorporates a detection assembly, generally shown at 26. The detection assembly 26 is preferably mounted to the arm 24 and even more preferably mounted to a wrist portion at the distal end of the arm 24 of the robotic apparatus 20. The detection assembly 26 monitors a process being performed on a workpiece 32. The process may be a laser or water jet cutting process, a welding process, a dispensing process, or any other suitable procedure which can be performed on the workpiece 32. For illustrative purposes, a dispensing process will be discussed in greater detail but is in no way intended to be limiting.

A processing tool 30, or in the illustrated embodiment an applicator 30, is mounted to the detection assembly 26 as is discussed in greater detail below. Preferably, the applicator 30 dispenses a continuous semi-circular bead of material 28, which may be an adhesive, sealant, or the like, onto the workpiece 32. The workpiece 32 is illustrated as a generically shaped panel which may represent a door panel, trim panel, or the like. As discussed in the background section, the adhesive or sealant material 28 is used to provide a moisture barrier and/or to reduce the intrusion or debris between, for example, a pair of door panels. As can be appreciated, any suitable material may be dispensed through the applicator 30 without deviating from the scope of the subject invention.

A material input port 34 is mounted to the applicator 30 for providing the material 28 to be dispensed. A control input port 36 is also mounted to the applicator 30 for providing pneumatic control to the applicator 30. As appreciated, the applicator 30 may alternatively be electronically controlled.

Figure 2:
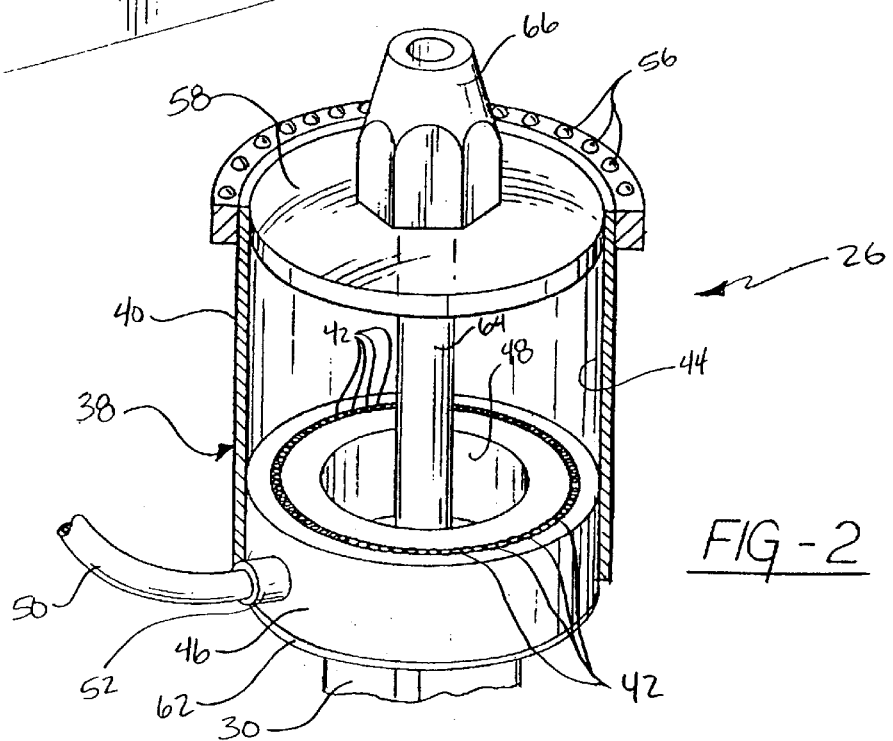
FIG. 2 is a partially fragmented perspective view of the detection assembly.

Referring to FIGS. 2 and 3, the preferred embodiment of the detection assembly 26 is shown in greater detail. The detection assembly 26 includes a mount or housing 38 having an outer periphery 40 with the applicator 30 mounted to the housing 38 for dispensing the material 28 onto the workpiece 32. It should be appreciated that the mount or housing 38 may be of any suitable design or configuration.

A plurality of sensors 42 are mounted to the housing 38 adjacent the outer periphery 40. Preferably, the outer periphery 40 of the housing 38 is substantially annular and the sensors 42 are aligned in a continuos ring adjacent the outer periphery 40. As appreciated, the housing 38 may be of any suitable shape or design with the sensors 42 being positioned around any suitable portion of the housing 38.

The subject invention is characterized by the outer periphery 40 of the housing 38 defining a central opening 44 with the applicator 30 extending through the opening 44 such that the sensors 42 substantially surround the applicator 30 to continuously detect the material 28 being dispensed through the applicator 30. The method of dispensing the material 28 and the continuous detection of the material 28 will be discussed in greater detail below.

In the preferred embodiment, the housing 38 includes a ring mount 46 supporting each of the sensors 42 and defining a passageway 48 for allowing the applicator 30 to pass therethrough. Hence, a continuous ring of sensors 42 completely surrounds the applicator 30. Even more preferably, the sensors 42 are light detecting optical sensors 42. It is appreciated that the sensors 42 may be any suitable type of sensing device such as radar, sonar, infrared, and the like.

The optical sensors 42 are further defined as a bundle of fiber optic light pipes 50 having first 52 and second 54 ends with the first ends 52 connected to the ring mount 46. Preferably, the first ends 52 of the light pipes are arranged annularly side by side within the ring mount 46. The ring mount 46 is preferably 1½ inches in diameter which can support 250 to 2,500 sensors 42 or fiber optic light pipes 50. Fiber optic light pipes 50 vary in size with larger fibers receiving more light but having lower resolution. It is preferred that there be approximately 1,000 sensors 42 or fiber optic light pipes 50 used within the ring mount 46.

A light source 56 is mounted to the housing 38 to illuminate the workpiece 32 and the dispensed material 28. Referring in particular to FIG. 3, light projecting from the light source 56 is reflected from the workpiece 32 and the dispensed material 28 into each of the optical sensors 42 surrounding the applicator 30. Preferably the light source 56 is a plurality of light emitting diodes 56 substantially surrounding the applicator 30. As appreciated, the light source 56 may be any suitable exterior illumination device or may be eliminated altogether such that the sensors 42 only utilize ambient light.

A lens 58 is mounted to the housing 38 and is spaced from the optical sensors 42 for focusing the reflected light into the optical sensors 42. The lens 58 images the reflected light and allows the detection assembly 26 to be spaced at varied distances relative to the workpiece 32. The size and relative location of the lens 58 to the ring mount 46 and sensors 42 may be altered as is desired. Hence, the ring of sensors 42 may be larger or smaller than the lens 58 depending upon the relative position of the lens 58 and imaged bead of dispensed material 28.

The lens 58 defines a passageway 60 for allowing the applicator 30 to pass therethrough. The lens 58 illustrated has a convexo-convex configuration, which is also known as a double-convex lens 58. It is appreciated that the lens 58 may be of any suitable design for imaging the bead 28 on the ring of sensors 42.

The housing 38 further includes a mounting plate 62 for providing a mounting point for the applicator 30. The applicator 30 includes a dispensing tube 64 extending through the central opening 44 of the housing 38 and the passageways 48, 60 of the ring mount 46 and the lens 58. The applicator 30 also includes a dispensing tip 66 mounted to a distal end of the dispensing tube 64. The dispensing tip 66 has a flow restrictor (not illustrated) for controlling a stream of dispensed material 28. It should be appreciated that the dispensing tube 64, dispensing tip 66 and other related components of the applicator 30 may be of any suitable design or configuration as is known in the dispensing art.

Referring to FIG. 4, an alternative embodiment of the detection assembly is generally shown wherein like numbers increased by 100 indicate like or corresponding parts. The detection assembly 126 of FIG. 4 eliminates the use of a lens and thereby reduces the length of the housing 138. The dispensing tube (not illustrated) is likewise reduced in length to correlate to the length of the housing 138. The elimination of the lens is believed to limit the relative distance between the detection assembly 126 and the workpiece 132. Hence, the detection assembly 126 will remain closer to the workpiece 132 such that the sensors 142 can accurately detect the presence or non-presence of the bead of material 128. It is contemplated that the detection assembly 126 may be able to operate effectively without the use of a lens so long as the sensors 142 are in close proximity to the dispensed material 128 and sufficiently sensitive to detect the dispensed material 128. The remaining aspects of this embodiment are essentially the same as the detection assembly 26 of FIG. 3.

Figure 5:
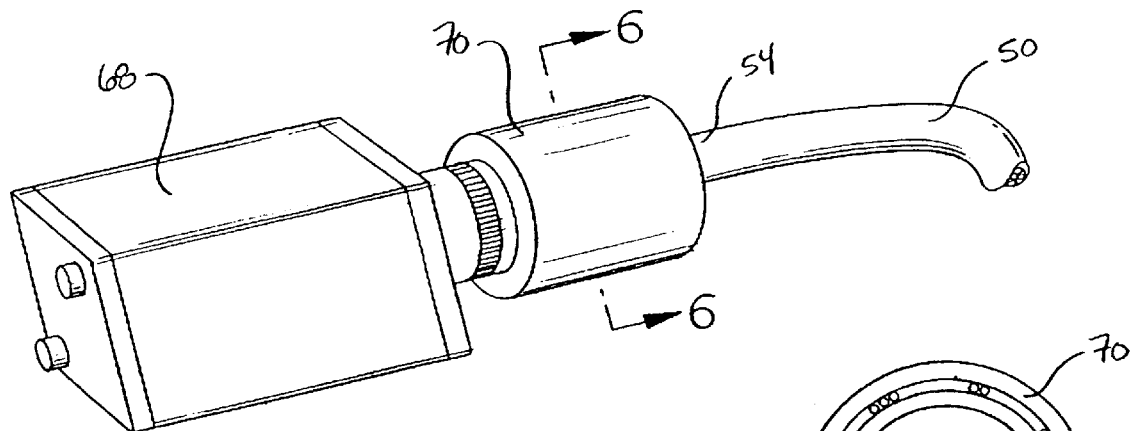
FIG. 5 is a perspective view of a detector having a ring coupler mounted to a second end of a bundle of light pipes.
Figure 6:
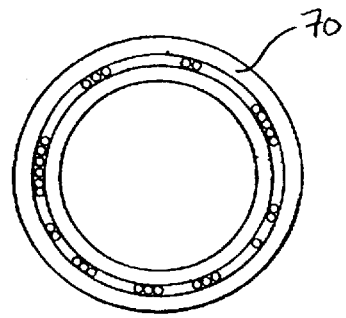
FIG. 6 is a cross-sectional view taken along line 6—6 of FIG. 5.
Figure 7:
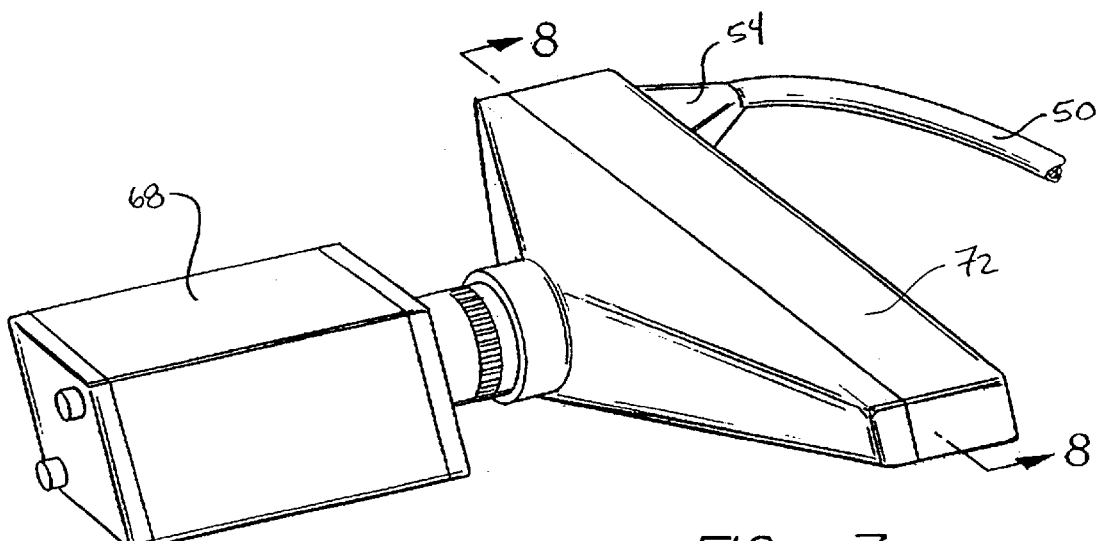
FIG. 7 is a perspective view of the detector having a linear coupler mounted to the second end of the light pipes.
Figure 8:
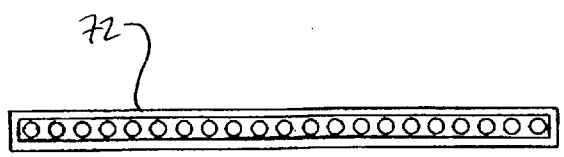
FIG. 8 is a cross-sectional view taken along line 8—8 of FIG. 7.

Referring to FIG. 5, a detector 68 is also included with the second end 54 of the light pipes 50 mounted to the detector 68 such that the detector 68 receives the reflected light passing through the light pipes 50. The detector 68 is preferably any type of suitable camera 68 having a conversion device (not illustrated) such that the reflected light received from the light pipes 50 can be converted into electrical signals identifying the presence of the material 28. Referring to FIGS. 5 and 6, a ring coupler 70 is disposed between the light pipes 50 and the camera 68 with the second ends 54 of the light pipes 50 being arranged side by side within the ring coupler 70 in an annular fashion which correlates to the annular arrangement of the first ends 52 within the ring mount 46. Alternatively, referring to FIGS. 7 and 8, a linear coupler 72 is disposed between the light pipes 50 and the camera 68 with the second ends 54 of the light pipes 50 being arranged side by side within the linear coupler 72 in a linear fashion which correlates to the annular arrangement of the first ends 52 within the ring mount 46.

Preferably, the light pipes 50 extending between the ring mount 46 and the detector 68 are arranged in a coherent bundle such that each position of the light pipes 50 in the ring mount 46 directly correlates to a corresponding position on the detector 68. Alternatively, the light pipes 50 extending between the ring mount 46 and the detector 68 can be arranged in a non-coherent bundle such that each position of the light pipes 50 in the ring mount 46 does not correlate to a particular position on the detector 68. If the light pipes 50 are arranged in a non-coherent bundle, the relative positions of the first 52 and second 54 ends of the light pipes 50 would have to be determined by a calibrating calculation as is known in the art.

Figure 9:
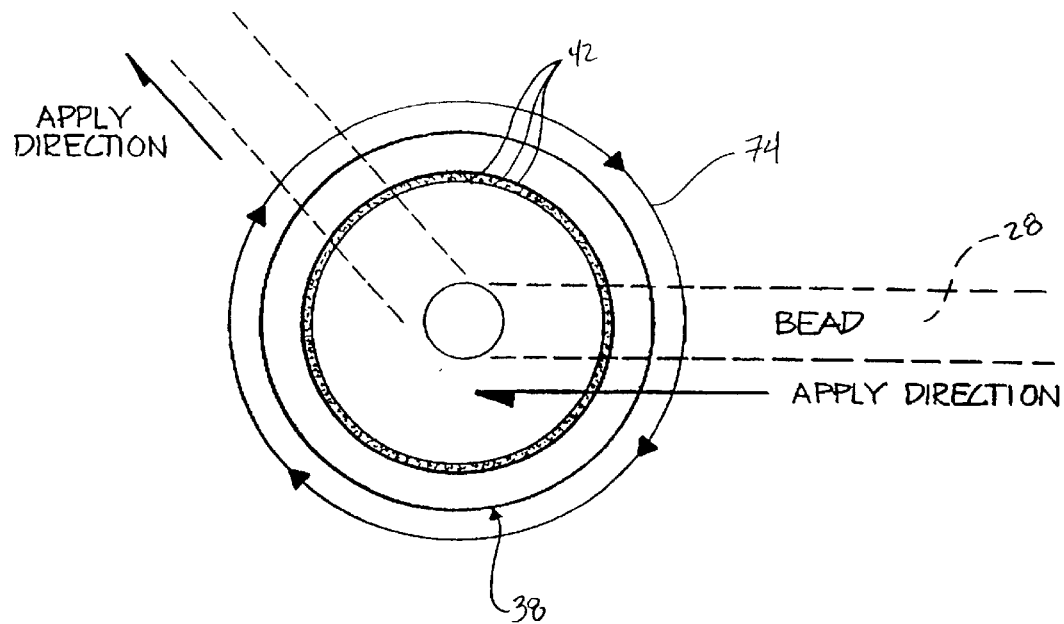
FIG. 9 is a schematic view illustrating the movement of the detection assembly.
Figure 10:
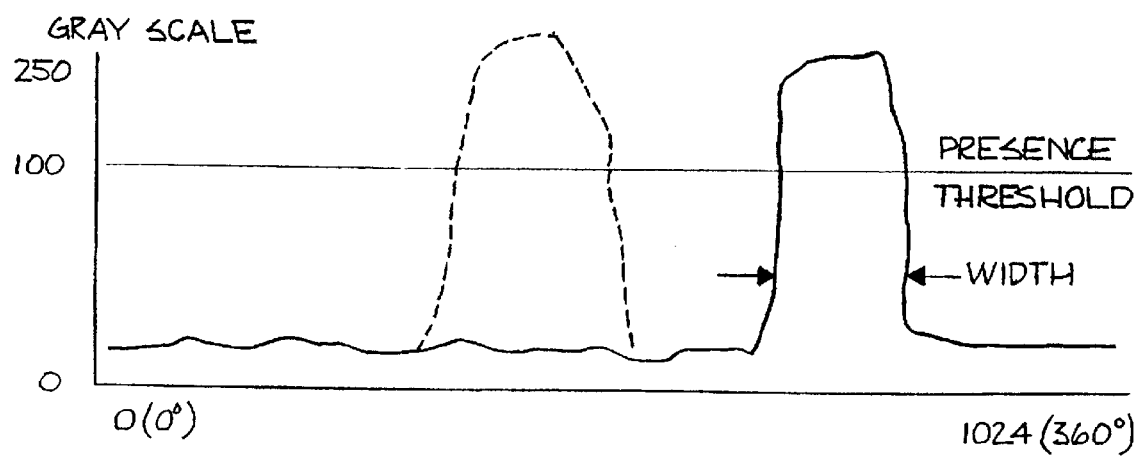
FIG. 10 is a graph illustrating gray scale values verses the position of a plurality of sensors.

Referring also to FIGS. 9 and 10, the specific method steps of the subject invention are now discussed in greater detail. In particular, the method comprises the steps of first dispensing the material 28 through the applicator 30 onto the workpiece 32, which is also shown in FIGS. 1, 3, and 4. The arm 24 of the robotic apparatus 20 then moves along a predetermined path as specified by the end user. Alternatively, the workpiece 32 can be moved under a fixed apparatus or there may be a combination of workpiece 32 and robotic movements.

Light intensity values reflected from the workpiece 32 and the dispensed material 28 are detected through each of the sensors 42 surrounding the applicator 30 while the arm 24 moves along the predetermined path. A bead of dispensed material 28 is typically ¼ inches wide and depending upon the total number of sensors 42, 25 to 250 sensors 42 will usually detect the presence of the bead of material 28.

The light intensity values are then arranged in a predetermined order. The arranged light intensity values are received within the detector 68 to continuously detect the presence of the material 28 applied to the workpiece 32. The arranging of the light intensity values refers to the particular arrangement as dictated by the coupler 70, 72 which interconnects the light pipes 50 and the detector 68 or camera. Preferably, the step of arranging of the light intensity values in a predetermined order is further defined as arranging the light values in a circular fashion by the use of the ring coupler 70. Alternatively, the step of arranging of the light intensity values in a predetermined order is further defined as arranging the light values in a linear fashion by the use of the linear coupler 72.

The method preferably includes the step of focusing the reflected light intensity values into the sensors 42 with a lens 58 and the step of illuminating the workpiece 32 and material with a light source 56.

The subject invention can detect the presence or non-presence of the dispensed material 28 regardless of the contours, bends, depressions, etc. of the workpiece 32 and regardless of the movements or the arm 24 of the robotic apparatus 20. As illustrated in FIG. 9, a sharp turn by the arm 24 moves the detector 68 assembly yet the bead of dispensed material 28 is continuously detected.

The step of detecting the light intensity values is further defined as detecting the light intensity values received through the sensors 42 in a predetermined order which correlates to the arrangement of the sensors 42. The method also further includes the step of mounting the sensors 42 in a ring shaped pattern and detecting the light intensity values in a circular fashion around the ring of sensors 42. The circular detecting is illustrated in FIG. 9 by the ring of arrows 74. Of course, the circular detection may occur in either clockwise or counter-clockwise directions. This circular detecting ensures that the material is continuously detected regardless of the shape of the workpiece 32.

The method also includes the step of converting the light intensity values into electronic signals through the use of the camera 68. Referring to FIG. 10, the step of converting the light intensity values into electronic signals is further defined as converting the light intensity values into gray scale values ranging from 0 to 255. The presence of the material is then detected when the gray scale value exceeds a predetermined value, for example 100. The graph charts each sensor, for example 1,024 sensors 42, entirely around the ring mount 46 (0 degrees to 360 degrees). As shown in the graph, the reflected light from the bead of material 28 will create a larger gray scale value than the reflected light from the workpiece 32. The width of the higher gray scale values represents the thickness of the bead of material 28. As the detection assembly 26 moves along the predetermined path, the presence of the bead of material 28 can move depending upon which sensors 42 are detecting the bead of material 28. An example of another detection is shown in phantom.

The invention has been described in an illustrative manner, and it is to be understood that the terminology which has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A detection assembly (26) for detecting dispensed material (28), said assembly comprising;
    a housing (38) having an outer periphery (40),
    a plurality of sensors (42) mounted to said housing (38) adjacent said outer periphery (40),
    an applicator (30) mounted to said housing (38) for dispensing the material (28),
    said assembly characterized by said outer periphery (40) of said housing (38) defining a central opening (44) with said applicator (30) extending through said opening (44) such that said sensors (42) substantially surround said applicator (30) to continuously detect the material (28) being dispensed through said applicator (30).

2. An assembly as set forth in claim 1 wherein said outer periphery (40) of said housing (38) is substantially annular and said sensors (42) are aligned in a continuous ring adjacent said outer periphery (40).

3. An assembly as set forth in claim 2 wherein said housing (38) further includes a ring mount (46) supporting each of said sensors (42) with said ring mount (46) defining a passageway (48) for allowing said applicator (30) to pass therethrough such that said continuous ring of sensors (42) completely surrounds said applicator (30).

4. An assembly as set forth in claim 3 wherein said sensors (42) are optical sensors (42).

5. An assembly as set forth in claim 3 further including a light source (56) mounted to said housing (38) for illuminating the dispensed material (28).

6. An assembly as set forth in claim 3 further including a workpiece (32) with said material (28) being dispensed onto said workpiece (32).

7. An assembly as set forth in claim 6 further including a light source (56) mounted to said housing (38) to illuminate said workpiece (32) and said material (28) wherein light projecting from said light source (56) is reflected from said workpiece (32) and said dispensed material (28) into each of said sensors (42) surrounding said applicator (30).

8. An assembly as set forth in claim 7 wherein said light source (56) is a plurality of light emitting diodes substantially surrounding said applicator (30).

9. An assembly as set forth in claim 3 wherein said housing (38) further includes a mounting plate (62) for providing a mounting point for said applicator (30).

10. An assembly as set forth in claim 9 wherein said applicator (30) further includes a dispensing tube (64) extending through said central opening (44) of said housing (38) and said passageway (48) of said ring mount (46).

11. An assembly as set forth in claim 10 wherein said applicator (30) further includes a dispensing tip (66) mounted to a distal end of said dispensing tube (64) and having a flow restrictor for controlling a stream of dispensed material (28).

12. An assembly as set forth in claim 5 further including a lens (58) mounted to said housing (38) and spaced from said sensors (42) for focusing reflected light into said sensors (42), said lens (58) defining a passageway (60) therein for allowing said applicator (30) to pass therethrough.

13. An assembly as set forth in claim 12 wherein said sensors (42) are further defined as a bundle of fiber optic light pipes (50) having first (52) and second (54) ends with said first ends (52) connected to said ring mount (46).

14. An assembly as set forth in claim 13 wherein said first ends (52) of said light pipes (50) are arranged side by side within said ring mount (46).

15. An assembly as set forth in claim 14 further including a detector (68) with said second ends (54) of said light pipes (50) mounted to said detector (68) such that said detector (68) receives said reflected light passing through said light pipes (50).

16. An assembly as set forth in claim 15 wherein said light pipes (50) extending between said ring mount (46) and said detector (68) are arranged in a coherent bundle such that each position of said light pipes (50) in said ring mount (46) correlates to a corresponding position on said detector (68).

17. An assembly as set forth in claim 15 wherein said light pipes (50) extending between said ring mount (46) and said detector (68) are arranged in a non-coherent bundle such that each position of said light pipes (50) in said ring mount 46 does not correlate to a particular position on said detector (68).

18. An assembly as set forth in claim 15 wherein said detector (68) is a camera (68) having a conversion device such that said reflected light received from said light pipes (50) can be converted into electrical signals for identifying the presence of the dispensed material (28).

19. An assembly as set forth in claim 18 further including a ring coupler (70) disposed between said bundle of light pipes (50) and said camera (68) with said second ends (54) of said light pipes (50) being arranged side by side within said ring coupler (70) in an annular fashion which correlates to the annular arrangement of said first ends (52) within said ring mount (46).

20. An assembly as set forth in claim 18 further including a linear coupler (72) disposed between said bundle of light pipes (50) and said camera (68) with said second ends (54) of said light pipes (50) being arranged side by side within said linear coupler (72) in a linear fashion which correlates to the annular arrangement of said first ends (52) within said ring mount (46).

21. An assembly as set forth in claim 1 further including a robot base (22) and at least one articulated arm (24) movably mounted to said robot base (22) with said housing (38) mounted to said arm (24) such that movement of said arm (24) correspondingly moves said detection assembly (26).

22. A robotic apparatus (20) incorporating a detection assembly (26) for detecting dispensed material (28), said apparatus comprising;
   a robot base (22),
   at least one articulated arm (24) movably mounted to said robot base (22),
   a housing (38) having an outer periphery (40) and mounted to said arm (24),
   a plurality of sensors (42) mounted to said housing (38) adjacent said outer periphery (40),
   an applicator (30) mounted to said housing (38) for dispensing the material (28),
   said apparatus characterized by said outer periphery (40) of said housing (38) defining a central opening (44) with said applicator (30) extending through said opening (44) such that said sensors (42) substantially surround said applicator (30) to continuously detect the material (28) being dispensed through said applicator (30).

23. An apparatus as set forth in claim 22 wherein said outer periphery (40) of said housing (38) is substantially annular and said sensors (42) are aligned in a continuos ring adjacent said outer periphery (40).

24. An apparatus as set forth in claim 23 wherein said housing (38) further includes a ring mount (46) supporting each of said sensors (42) with said ring mount (46) defining a passageway (48) for allowing said applicator (30) to pass therethrough such that said continuous ring of sensors (42) completely surrounds said applicator (30).

25. An apparatus as set forth in claim 22 further including a light source (56) mounted to said housing (38) for illuminating the dispensed material (28).

26. An apparatus as set forth in claim 25 further including a lens (58) mounted to said housing (38) and spaced from said sensors (42) for focusing reflected light into said sensors (42), said lens (58) defining a passageway (60) therein for allowing said applicator (30) to pass therethrough.

27. An apparatus as set forth in claim 26 wherein said sensors (42) are further defined as a bundle of fiber optic light pipes (50) having first (52) and second (54) ends with said first ends (52) connected to said ring mount (46).

28. An apparatus as set forth in claim 27 further including a detector (68) with said second ends (54) of said light pipes (50) mounted to said detector (68) such that said detector (68) receives said reflected light passing through said light pipes (50).

29. An apparatus as set forth in claim 28 wherein said detector (68) is a camera (68) having a conversion device such that said reflected light received from said light pipes (50) can be converted into electrical signals for identifying the presence of the dispensed material (28).

30. A method of detecting material (28) dispensed upon a workpiece (32) utilizing a robotic apparatus (20) having an articulated arm (24) with a housing (38) mounted to the arm

(24) and an applicator (30) mounted to the housing (38), a plurality of sensors (42) substantially surround the applicator (30) and are connected to a detector (68), said method comprising the steps of;

dispensing the material (28) through the applicator (30) onto the workpiece (32);

moving the arm (24) along a predetermined path;

detecting light intensity values reflected from the workpiece (32) and the dispensed material (28) through each of the sensors (42) surrounding the applicator (30) while the arm (24) moves along the predetermined path;

arranging the light intensity values in a predetermined order; and receiving the arranged light intensity values within the detector (68) to continuously detect the presence of the material (28) applied to the workpiece (32).

31. A method as set forth in claim 30 wherein the step of detecting the light intensity values is further defined as detecting the light intensity values received through the sensors (42) in a predetermined order which correlates to the arrangement of the sensors (42).

32. A method as set forth in claim 31 further including the step of mounting the sensors (42) in a ring shaped pattern and detecting the light intensity values in a circular fashion around the ring of sensors (42).

33. A method as set forth in claim 30 wherein the step of arranging of the light intensity values in a predetermined order is further defined as arranging the light values in a linear fashion.

34. A method as set forth in claim 30 wherein the step of arranging of the light intensity values in a predetermined order is further defined as arranging the light values in a circular fashion.

35. A method as set forth in claim 30 further including the step of converting the light intensity values into electronic signals.

36. A method as set forth in claim 35 wherein the step of converting the light intensity values into electronic signals is further defined as converting the light intensity values into gray scale values ranging from 0 to 250.

37. A method as set forth in claim 36 further including the step of detecting the presence of the material when the gray scale value exceeds 100.

38. A method as set forth in claim 30 further including the step of focusing the reflected light intensity values into the sensors (42) with a lens (58).

39. A method as set forth in claim 30 further including the step of illuminating the workpiece (32) and material (28) with a light source (56).

40. A detection assembly (26) for monitoring a process being performed on a workpiece (32), said assembly comprising;

a mount (38), a processing tool (30) secured to said mount (38) for performing the process on the workpiece (32), said assembly characterized by a plurality of sensors (42) secured to said mount (38) and substantially surrounding said processing tool (30) to continuously detect the process being performed on the workpiece (32).

41. An assembly as set forth in claim 40 wherein said mount (38) is further defined as a housing (38) having an outer periphery (40) with said sensors (42) disposed adjacent said outer periphery (40).

42. An assembly as set forth in claim 41 wherein said outer periphery (40) of said housing (38) defines a central opening (44) with said processing tool (30) extending through said opening (44) such that said sensors (42) disposed on said outer periphery (40) substantially surround said processing tool (30).

43. An assembly as set forth in claim 42 wherein said processing tool (30) is an applicator (30) for dispensing material (28) onto the workpiece (32).

44. An assembly as set forth in claim 40 wherein said sensors (42) are optical sensors (42).

45. An assembly as set forth in claim 44 wherein said sensors (42) are further defined as a bundle of fiber optic light pipes (50).

46. An assembly as set forth in claim 45 further including a detector (68) with said light pipes (50) mounted to said detector (68) such that said detector (68) receives reflected light passing through said light pipes (50).

* * * * *